United States Patent [19]

Knight et al.

[11] Patent Number: 4,846,353
[45] Date of Patent: Jul. 11, 1989

[54] BICYCLE STAND

[75] Inventors: John B. Knight, 271 East 24th Avenue, Vancouver, British Columbia, Canada, V5V 1Z7; Raymond B. Rodway, Vancouver, Canada

[73] Assignee: John B. Knight, Vancouver, Canada

[21] Appl. No.: 125,942

[22] Filed: Nov. 27, 1987

[51] Int. Cl.⁴ .................................................. A47F 7/00
[52] U.S. Cl. ....................................... 211/22; 211/189
[58] Field of Search ..................... 211/22, 17, 20, 21, 211/23, 24, 189, 194, 195, 200, 14; 248/165

[56] References Cited

U.S. PATENT DOCUMENTS

| 350,990 | 3/1886 | Philbrick. | |
|---|---|---|---|
| 518,325 | 12/1893 | Mueller. | |
| 519,016 | 5/1894 | Clairmont | 211/22 |
| 589,643 | 3/1897 | De Mers. | |
| 593,521 | 11/1897 | Fowler | 211/22 |
| 1,738,276 | 12/1929 | Barney | 248/165 |
| 2,107,178 | 2/1938 | Fackler | 248/165 X |
| 2,662,713 | 12/1953 | Johnson | 248/165 X |
| 2,696,389 | 11/1954 | Cessford. | |
| 3,980,320 | 9/1976 | Marchello. | |

FOREIGN PATENT DOCUMENTS 914220 10/1946 France .................................. 211/14

Primary Examiner—Reinaldo P. Machado
Assistant Examiner—Sarah A. Lechok Elay
Attorney, Agent, or Firm—Carver & Co.

[57] ABSTRACT

The invention provides a collapsible bicycle stand for supporting a bicycle in an inverted position. The stand includes two generally similar assemblies which can be collapsed and are sufficiently light to permit carrying with the bicycle for emergency use. The stand assemblies have first and second stand members, one of which has a seat to receive a portion of the bicycle handlebar therein. One stand member has a clearance to receive a portion of the remaining stand member therein so that the stand members cooperate to support each other.

9 Claims, 4 Drawing Sheets

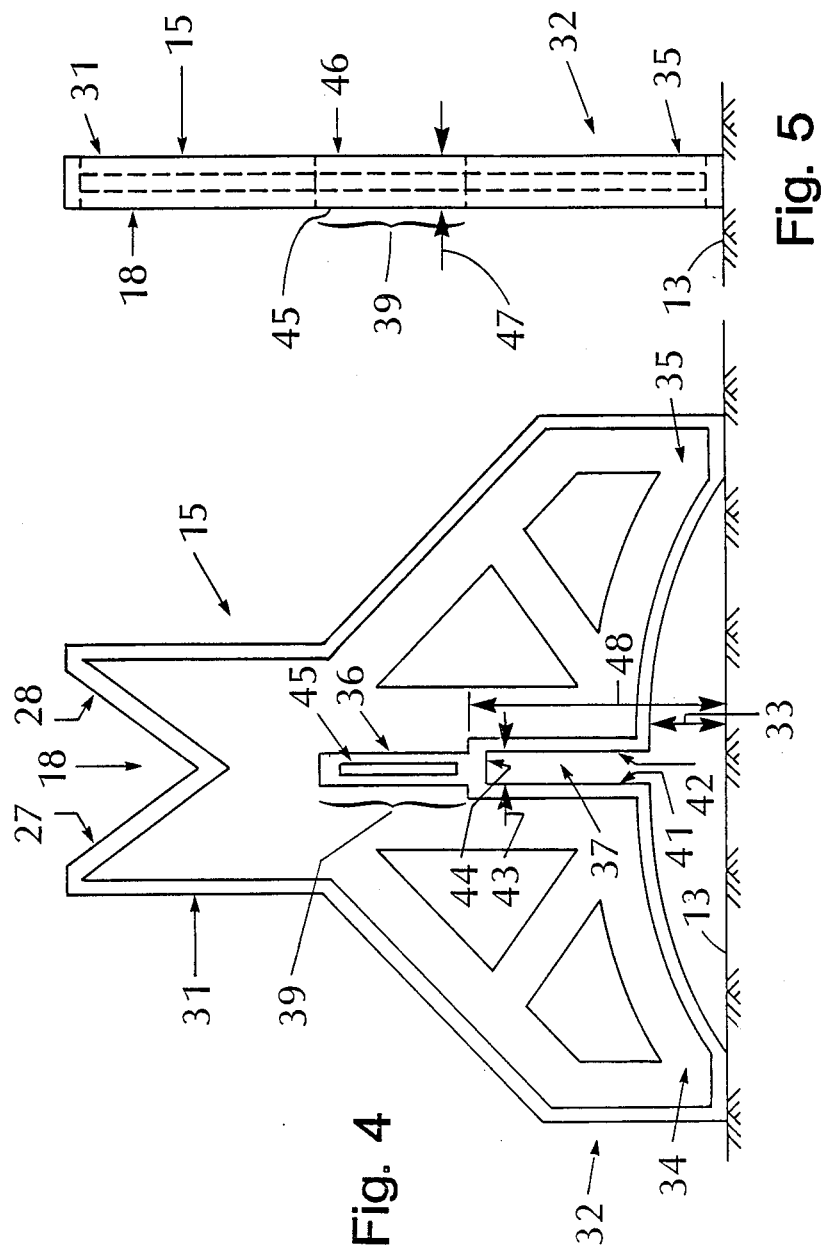

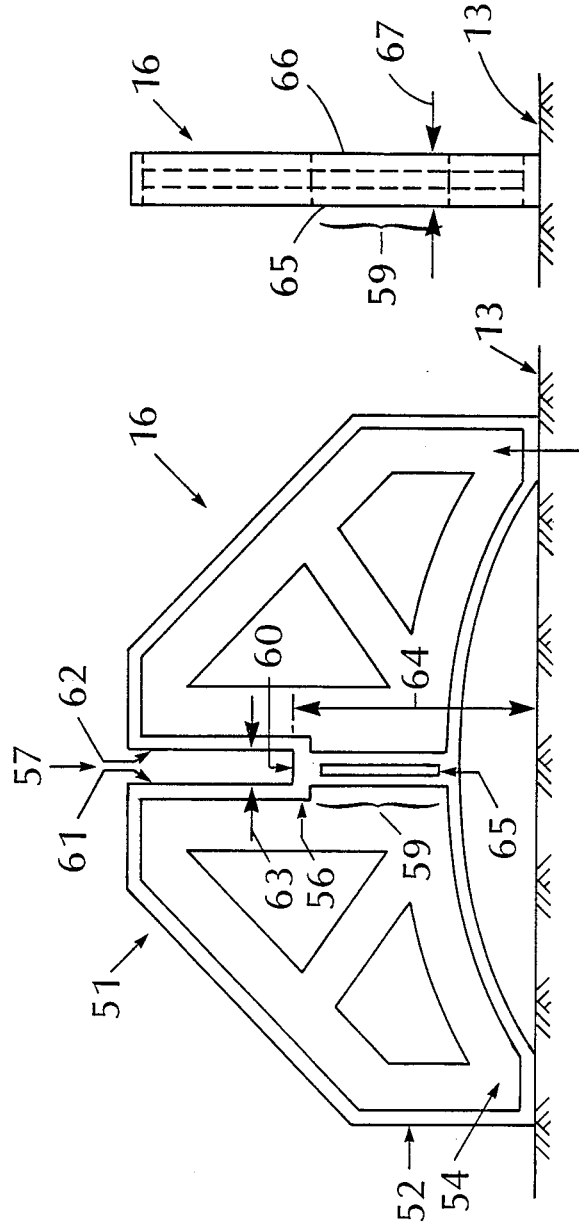

BICYCLE STAND

BACKGROUND OF THE INVENTION

The invention provides a bicycle stand assembly which supports a bicycle in an inverted position for servicing and storage.

To perform certain service tasks on a bicycle, for example, removing wheels, it is common to support the bicycle in an inverted position, resting on its handlebars and saddle. Many bicycles have accessories mounted on the handlebars such as gearshift levers, bells, headlamps and brake levers, and these commonly project above the handlebar when the bicycle is in an upright position. Also, many bicycles utilize brakes actuated by "Bowden" cables which normally also project above the handlebars when a bicycle is in an upright position, particularly those bicycles having "drop" handlebars. When such a bicycle is inverted and rests on the ground on its handlebars, the accessories can contact the ground and can be damaged, and can also cause the bicycle to be unstable when supported in an inverted position. Also, the Bowden cables usually interfere with the ground and are commonly bent severely. When the bicycle is set upright again, severe bends can persist in the cables and these can interfere with braking due to increased friction occurring at the bends in the cables. Also, positioning handlebars upside down on a rough surface can scratch the handlebars, or handlebar covering material or decroative trim. Storing a bicycle in a small apartment presents problems due to restricted space available, and the risk of defacing apartment walls by leaning the bicycle against the wall so that the handlebars and saddle touch the wall.

Stands to hold bicycles in an inverted position have been devised, two such stands being shown in U.S. Pat. Nos. 350,990 (Philbrick) and 589,643 (De Mers). Both of the stands shown in these patents are adapted to hold the bicycle in either an upright or an inverted position. While the stand of Philbrick is collapsible, it is fabricated from bent metal rod portions which are relatively long, heavy and would not fold into a small space. Furthermore, the stand of Philbrick is particularly adapted for "penny-farthing" bicycles, and probably would not be appropriate for a modern bicycle. The stand of De Mers would support a modern bicycle as described, but does not appear to be collapsible. Thus both stands discussed above would be impractical for carrying on a bicycle for emergency use.

SUMMARY OF THE INVENTION

The invention reduces difficulties and disadvantages of the prior art by providing a bicycle stand assembly which is easily collapsible into small portions, and is lightweight and thus can be easily carried with normal bicycle gear to facilitate roadside repairs. Furthermore, the bicycle stand of the invention includes two similar stand assemblies which can be produced by modern plastic injection methods, thus producing a lightweight, low cost item which is adaptable to many different types of bicycles and handlebars designs. Furthermore, because the invention includes two separate assemblies which cooperate at different locations on the handlebars, the assemblies can be positioned widely spaced apart on relatively uneven surfaces to provide a stable support for the bicycle which would otherwise not be possible. The stand is easy to assemble and disassemble, and provides sufficient height for supporting the handlebars so that accessories mounted on the handlebars and the Bowden cables extending from the brakes are not in contact with a supporting surface. The stand can also be used to store the bicycle in an inverted position, without leaning against the wall, thus preventing defacing of the walls.

A bicycle stand assembly according to the invention has first and second stand members, the stand members having upper and lower portions. The upper portion of the first stand member has seat means adapated to receive a portion of the bicycle handlebars therein. The lower portions of the first and second stand members are adapated to contact a supporting surface. On stand member has clearance means adapted to receive releasably a portion of the remaining stand member therein, so that the stand members cooperate with each other to support each other.

A detailed disclosure following, related to drawings, describes a preferred embodiment of the invention which is capable of expression in structure other than that particularly described and illustrated.

DESCRIPTION OF THE DRAWINGS

FIG. 4 is a simplified front elevation of a first stand member according to the invention, FIG. 5 is a simplified end elevation of the first stand member, FIG. 6 is a simplified front elevation of a second stand member according to the invention, FIG. 7 is a simplified end elevation of the second stand member.

DETAILED DISCLOSURE

Figure 1:
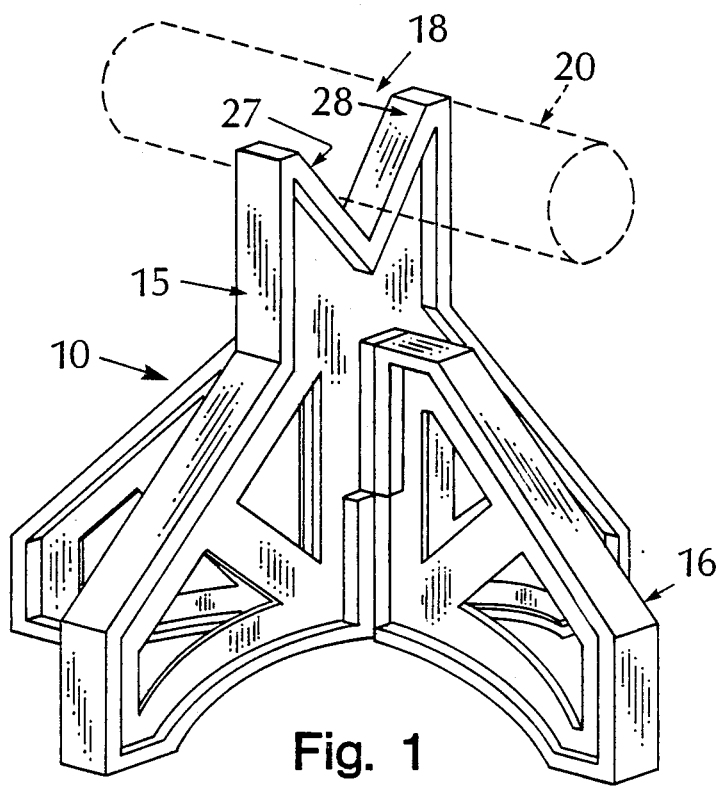
FIG. 1 is a simplified perspective showing one portion of a bicycle stand assembly according to the invention cooperating with a portion of handlebars.
Figure 2:
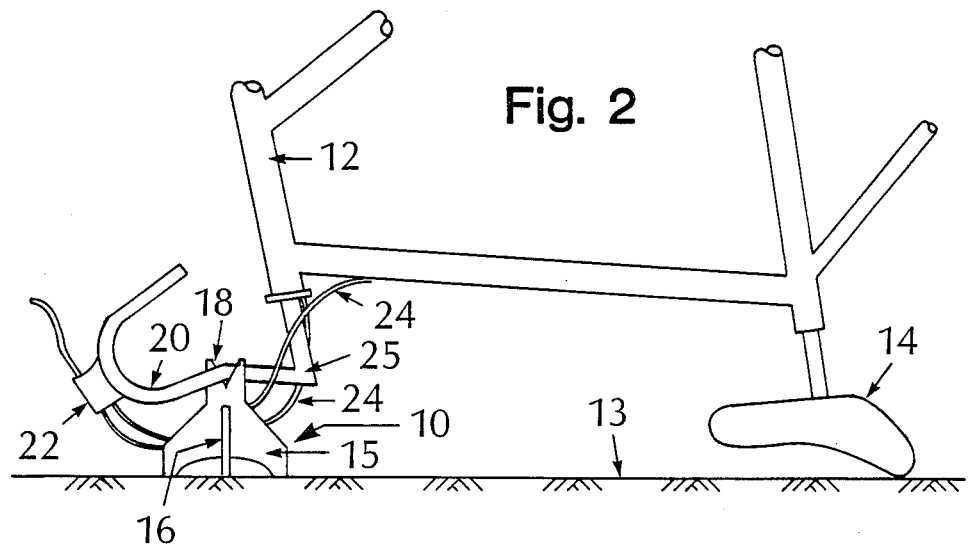
FIG. 2 is a simplified fragmented side elevation showing one bicycle stand assembly only supporting a bicycle in an inverted position, lower portions only of the bicycle being shown.
Figure 3:
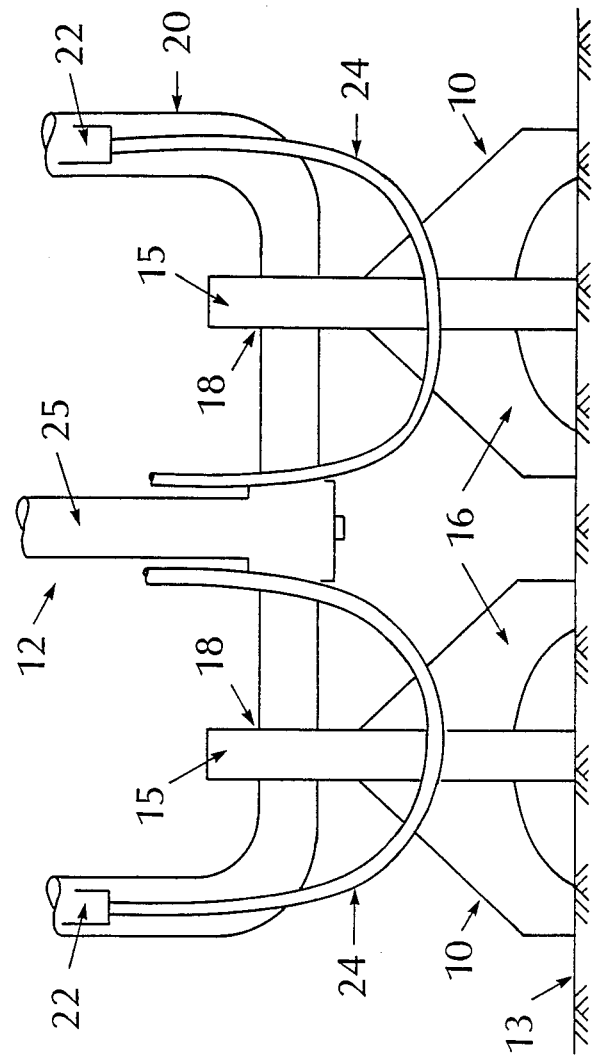
FIG. 3 is a simplified fragmented front elevation of two bicycle stand assemblies according to the invention shown cooperating with handlebars only of the bicycle.

FIGS. 1 through 3

A bicycle stand according to the invention has two essentially identical bicycle stand assemblies, one such stand assembly being designated 10 and shown in FIGS. 1 and 2. The bicycle stand assembly is shown supporting a bicycle 12 in an inverted position above a supporting surface 13. The rear of the bicycle is supported by resting on a saddle 14. The stand assembly according to the invention has first and second stand members 15 and 16 which cooperate together, by means to be described, to support the stand assembly in an upright position as shown. The first stand member has a V-shaped seat or seat means 18 which cooperates with a portion of handlebars 20 of the bicycle, as seen in FIGS. 1 and 2.

The bicycle is shown having common "drop" handlebars, which are fitted with brake levers 22 from which Bowden cables 24 extend as loops prior to passing adjacent a handlebar stem 25 to front and rear brakes, not shown. As seen in FIGS. 2 and 3, when the handlebars are supported on the stand assemblies, the Bowden cables 24 are spaced clear of the surface 13, and thus are not damaged. The seat means 18 of the first member has a V-shaped recess having inclined side walls 27 and 28 to contact portions of the handlebars 20 as best seen in broken outline in FIG. 1. The side walls of V-shaped recess can be lined with suitable soft material to prevent damage to handlebars or coverings thereof.

FIGS. 4–7

Referring to FIGS. 4 and 5, the first stand member 15 has upper and lower portions 31 and 32 and a central portion 36, the upper portion having the V-shaped seat 18 to receive a portion of the handlebar therein. The lower portion has laterally spaced apart foot portions 34 and 35 which extend lower than the central portion 36 so that the foot portions contact the surface 13. A vertical clearance or space 33 extends between the central portion 36 and the foot portions and increases resistance to rocking of the assembly on an uneven surface 13.

The central portion 36 of the stand member has an upwardly extending first slot 37, and a first engaging portion 39. The first slot extends generally vertically upwardly from the adjacent lower portion of the first stand member, and generally centrally thereof. The first engaging portion 39 is disposed above and generally aligned with the first slot and between the V-shaped seat 18 and the first slot 37. The first slot 37 has parallel side walls 41 and 42 which are spaced apart at a slot width 43. The slot 37 has a first slot end 44 which is spaced from the supporting surface at a first slot end height 48. The engaging portion 39 has generally parallel spaced apart walls 45 and 46 which define a thickness 47 which is essentially equal to the slot width 43 to provide a "snug" fit with negligible lost motion..

Referring to FIGS. 6 and 7, the second stand member 16 has upper and lower portions 51 and 52, and a central portion 56. The lower portion has laterally spaced apart foot portions 54 and 55 which are adapted to contact the supporting surface 13. Similarly to the member 15, the foot portions 54 and 55 extend lower than the central portion 56 of the stand member so as to increase resistance to rocking. The second stand member 16 has a second slot 57 which extends generally vertically downwardly from the upper portion of the stand member and generally centrally thereof. The second stand member 16 has a second engaging portion 59 which is disposed below and generally aligned with the second slot. Similarly to the slot 37, the second slot 57 has generally parallel side walls 61 and 62 spaced apart at a slot width 63. The second slot 57 has a second slot end 60 which is spaced from the supporting surface 13 at a second slot end height 64. The height 48 of the first slot end is preferably equal to the height 64 of the second slot end. The height 48 should not be less than the height 64 to prevent premature interference between the slot ends when the stand members cooperate with each other as will be described. Similarly to the first stand member, the engaging portion 59 has generally parallel spaced apart walls 65 and 66 which define a thickness 67 which is essentially equal to the slot width 63 to provide a snug fit with negligible lost motion.

The first and second stand members are preferably injection molded from a tough plastic, and undesignated conventional stiiffening webs, continuous peripheral flanges and lightening openings are provided as shown. Critical areas of the stand members include the thicknesses 47 and 67 of the engaging portions, and the widths 43 and 63 of the slots. These thicknesses and widths are selected to be complementary to each other so as to permit an easy sliding but snug fit between the two stand members, in the manner of a "Chinese puzzle" as seen in FIGS. 1-3. To avoid rocking on the flat surface 13, the four foot portions should be essentially coplanar, and thus the slot ends should not interfere prematurely with each other as described above. Premature interference between the slot ends would result in one pair of foot portions being at a different height than an opposite pair which could cause the stand to "rock" on the surface 13. While rocking can occur with four coplanar foot portions of the stand assembly on an uneven surface, in practice rocking has been found to be relatively unimportant and sufficient stability is obtained with the present invention. The stand can be adjusted to support the bicycle on an uneven surface, for example a fallen log, without rocking, by shifting one stand member relative to the other stand member so that one pair of foot portions projects below the other pair of foot portions. Friction between the two stand members is usually sufficient to prevent inadvertent movement between the stand members when the stand members are disposed asymmetrically as described above.

It can be seen that the first and second slots serve as first and second clearance means to receive engaging portions of the second and first stand members respectively therein. Consequently, the relative thickness of the engaging portions and width of the complementary slot are quite critical, and excessive clearance should be avoided.

OPERATION

In operation, the slot 37 of the first stand member is aligned with the slot 57 of the second stand member, while the two members are disposed at right angles to each other. As seen in FIG. 1, slight inwards movement between the two members causes the outer portions of side walls of one slot to engage edges of peripheral flanges of an adjacent slot, prior to becoming aligned with and engaging coplanar engaging portions of the remaining side member. When the stand members are fully engaged, the four foot portions 34, 35, 54 and 55 should be generally coplanar, although restricted sliding movement between the stand members permits limited accommodation, as described for use on an uneven surface.

The invention requires two similar stand assemblies 10 which are spaced apart on the surface 13 with the respective seats 18 aligned with each other to receive the handlebars 20 therein, as seen in FIGS. 2 and 3. The stand assemblies should be spaced apart as wide as possible to accommodate the particular design of handlebars.

ALTERNATIVES

The invention as described shows each stand member having a respective slot and respective engaging portion. It can be seen that the slot of one stand member serves as a clearance means which is adapted to receive releasably a portion of the remaining stand member therein so that the stand members cooperate with each other to support each other. Clearly, in an alternative, it is possible to reduce the size of, or even eliminate, the slot of one stand member, and make corresponding changes to the complementary engaging portion of the remaining stand member. In this way, one stand member only would have clearance means to receive a portion of the remaining stand member. It is considered that this alternative would not be as rigid or as easy to fabricate as the preferred embodiment described. Whichever stand member has the slot, the remaining stand member has engaging portions with generally parallel spaced apart walls to define a thickness approximately equal to the slot width so as to be received snugly in the slot.

Also, the engaging portions of both stand members are described as having equal thicknesses, so that each stand member has a particular slot which has a width essentially equal to thickness of its adjacent or respective engaging portion. Thus, the first slot width equals the thickness 47 of the first engaging portion of the first stand member. In an alternative, the engaging portion could have different thicknesses in which case the adjacent slot would be of different width.

We claim:

1. A bicycle stand assembly including:
 (a) a first stand member having upper and lower portions, the upper portion having seat means adapted to receive a portion of the bicycle handlebars therein, the seat means being generally V-shaped and having inclined intersecting side walls, the lower portion being adapted to contact a supporting surface,
 (b) a second stand member having upper and lower portions, the upper portion of the second stand member being positioned entirely below the seat means of the first stand member when the stand members are assembled, so that the seat means is clear of obstruction so as to prevent interference with the bicycle handlebars when resting in the seat means, the lower portion of the second stand member being adapted to contact the supporting surface,
 (c) one of the members stand having clearance means adapted to receive releasably a portion of the remaining stand member therein, so that the stand members cooperate with each other to support each other.

2. An assembly as claimed in claim 1 in which:
 (a) the clearance means of the said one stand member is a slot in the first stand member remote from the seat means and adapted to receive in a sliding fit the second stand member therein.

3. An assembly as claimed in claim 2 in which
 (a) the slot of the clearance means of the first stand member has generally parallel side walls spaced apart at a slot width,
 (b) the second stand member has engaging portions with generally parallel spaced apart walls defining a thickness approximately equal to the slot width.

4. An assembly as claimed in claim 1 which:
 (a) the first stand member has first clearance means remote from the seat means to receive an engaging portion of the second stand member therein,
 (b) the second stand member has a second clearance means to receive an engaging portion of the first stand member therein.

5. An assembly as claimed in claim 1 in which:
 (a) the first stand member has a first engaging portion, and a first clearance means characterized by an upwardly extending first slot which extends upwardly from a lower edge of the lower portion of the first stand member and is disposed remotely from the seat means,
 (b) the second stand member has a second engaging portion, and a second clearance means characterized by a downwardly extending second slot which extends downwardly from an upper edge of the upper portion of the second stand member,
 wherein the first and second engaging portions are received in the second and first slots respectively.

6. An assembly as claimed in claim 5 in which:
 (a) the first slot extends generally vertically upwardly from the lower portion of the first stand member and generally centrally thereof, the first engaging portion being disposed above and aligned with the first slot,
 (b) the second slot extends generally vertically downwardly from the upper portion of the second stand member and generally centrally thereof, the second engaging portion being disposed below and aligned with the second slot.

7. An assembly as claimed in claim 5 in which:
 (a) the first and second slots have respective first and second slot ends, the first slot end being spaced from the supporting surface at a height no less than a height of the second slot end spaced above the surface.

8. An assembly as claimed in claim 1 in which:
 (a) the lower portion of each stand member has laterally spaced apart foot portions which extend lower than a central portion of the respective stand member so as to increase resistance to rocking of the assembly.

9. An assembly as claimed in claim 5 in which:
 (a) the lower portion of each stand member has laterally spaced apart foot portions which extend lower than a central portion of the respective stand member to increase resistance to rocking of the assembly,
 (b) the foot portions of the first and second stand member are spaced equally apart from the first and second slots respectively.

* * * * *